(12) United States Patent
Itou et al.

(10) Patent No.: US 6,637,662 B2
(45) Date of Patent: Oct. 28, 2003

(54) DATA CODE IMAGE READING APPARATUS

(75) Inventors: Kunihiko Itou, Chiryu (JP); Koji Konosu, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/935,768

(22) Filed: Aug. 24, 2001

(65) Prior Publication Data

US 2002/0023961 A1 Feb. 28, 2002

(30) Foreign Application Priority Data

Aug. 28, 2000 (JP) ........................................ 2000-257183

(51) Int. Cl.⁷ ................................................. G06R 7/10
(52) U.S. Cl. ................................... 235/472.01; 235/494
(58) Field of Search .............................. 235/472.01, 494

(56) References Cited

U.S. PATENT DOCUMENTS

| 5,414,251 A | 5/1995 | Durbin |
| 5,659,167 A | 8/1997 | Wang et al. |
| 5,821,523 A | 10/1998 | Bunte et al. |
| 6,330,975 B1 * | 12/2001 | Bunte et al. ........... 235/472.01 |

FOREIGN PATENT DOCUMENTS

EP          0873013          10/1998

* cited by examiner

*Primary Examiner*—Harold I. Pitts
(74) *Attorney, Agent, or Firm*—Posz & Bethards, PLC

(57) ABSTRACT

Two-dimensional code image is read with a two-dimensional CCD, and displayed on an LCD. Keys or a touch panel can input a message regarding the read image by hand. The read image and the message displayed on the LCD are stored in the EEPROM with relationship therebetween.

14 Claims, 5 Drawing Sheets

DATA CODE IMAGE READING APPARATUS

BACKGROUND OF THE INVENTION

1. Field of the Invention

This invention relates to a data code image reading apparatus for optically reading a data code image.

2. Description of the Prior Art

Data code image readers for reading two-dimensional code data are known. U.S. Pat. Nos. 5,414,251 and 5,659,167 disclose such data code image readers for POS systems. The data code image reader disclosed in U.S. Pat. No. 5,414,251 processes the output of selected images via pattern recognition means, and images recognized to contain decodable optical information are displayed and highlighted by a display. The data code image reader disclosed in U.S. Pat. No. 5,659,167 displays data code image matrix or two-dimensional bar code. The image is continuously updated as the data form filled with entered data. Using the display and an input unit such as a keyboard, digitizer or scanner, the decoded data can be edited to add, modify or delete data while observing the resulting data code image.

SUMMARY OF THE INVENTION

The aim of the present invention is to provide a superior data code image reading apparatus capable of reading and storing data that is related to the data code image and that is manually input into the apparatus.

According to the present invention, a first aspect of the present invention provides a data code image reading apparatus comprising: optical reading means for reading data code image as image data; display means for displaying said image data; data input means for inputting data relating said image data; and storing means for storing said image data and said data with relationship therebetween.

According to the present invention, a second aspect of the present invention provides a data code image reading apparatus based on the first aspect, further comprises outputting means for outputting said image data and said data with said relationship.

According to the present invention, a third aspect of the present invention provides a data code image reading apparatus based on the first aspect, wherein said data input means comprises a transparent touch panel on a displaying surface of said display means.

According to the present invention, a fourth aspect of the present invention provides a data code image reading apparatus based on the first aspect, wherein said data input means comprises a keyboard having a plurality of keys and having a character mode and a non-character mode, wherein, in said character mode, said data input means inputs a character by a predetermined key operation.

According to the present invention, a fifth aspect of the present invention provides a data code image reading apparatus based on the fourth aspect, wherein said data input means further includes a memory and a character conversion mode for converting a set of characters previously inputted by said data input means into another type of character.

According to the present invention, a sixth aspect of the present invention provides a data code image reading apparatus comprising: optical reading means for reading data code image as image data; display means for displaying said image data; data input means for inputting data relating said image data; and outputting means for outputting said image data and said data with relationship therebetween.

According to the present invention, a seventh aspect of the present invention provides a data code image reading apparatus based on the sixth aspect, further comprises storing means for storing said image data and said data to supply said image data and said data to said outputting means with relationship therebetween.

According to the present invention, an eighth aspect of the present invention provides a data code image reading apparatus based on the first aspect, further comprises: recognizing and decoding means for recognizing and decoding said image data; and judging means for judging whether said image data is correctly decoded, wherein said data input means operates to input said data relating said image data when said image data is incorrectly decoded, and said storing means stores the decoded data in place of said image data when said image data is correctly decoded.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

A portable reader for reading a QR (quick response) code will be described as an embodiment of this invention.

Figure 1:
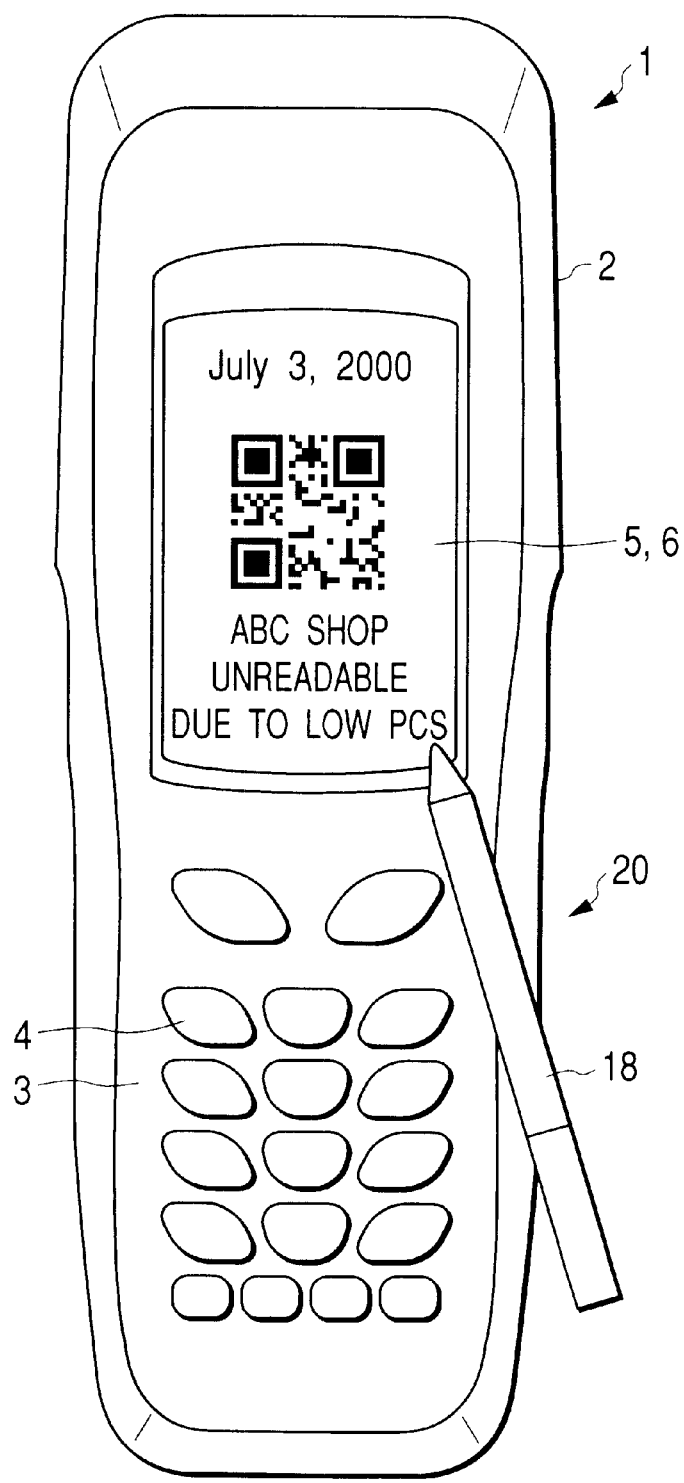
FIG. 1 is a plan view of a portable reader according to the present invention.

As shown in FIG. 1, the portable reader 1 includes a portable case 2. The portable case 2 has a grip portion 20. At the grip portion 20 a keyboard 3 including a plurality of keys 4 is provided. At the top surface of the portable case 2, a liquid crystal display (LCD) 5 above (in the drawing) the keyboard 3. On the displaying surface of the liquid crystal display 5, a touch panel 6 is provided which is transparent to show the displayed image therethrough.

Figure 2:
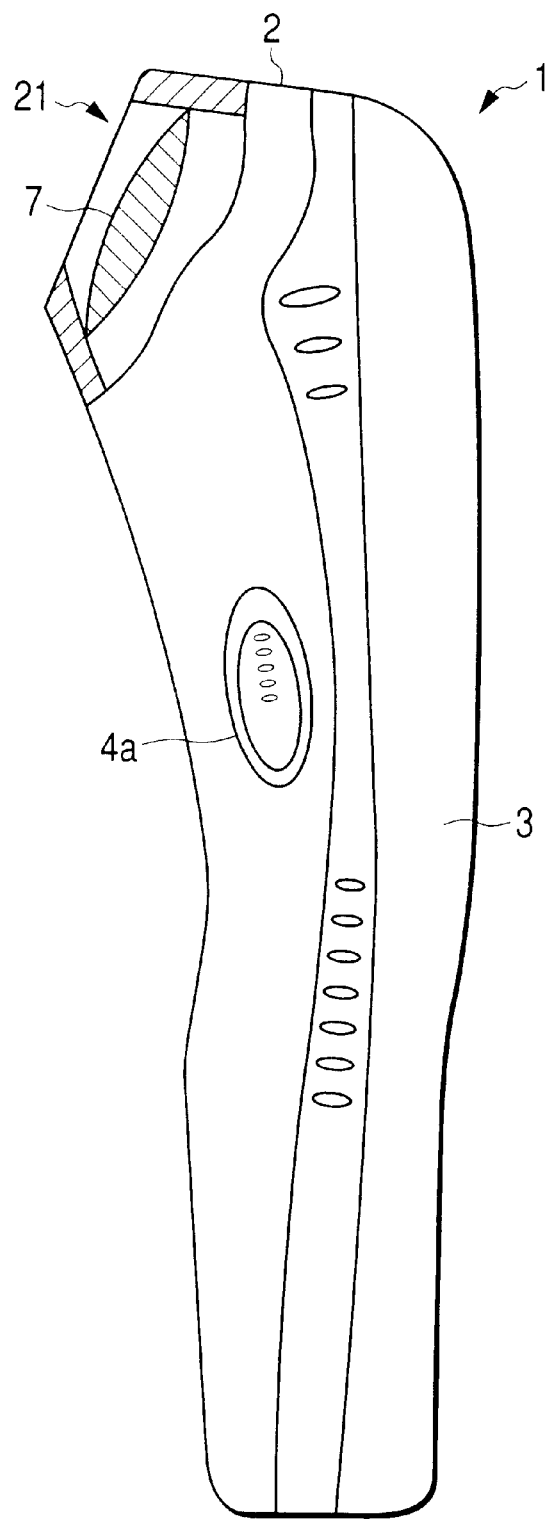
FIG. 2 is a side elevation view, a portion broken away for clarity, of the portable reader according to the present invention.

The tip of the case 2 has an opening portion 21, and a lens 7 is fixed to the opening portion 21 as shown in FIG. 2. On the optical axis determined by the lens 7, a two-dimensional CCD (charged-coupled device) 8 (shown in FIG. 3) is provided. An image illuminated by an illumination LED (light-emitting diode) 14 is projected on the two-dimensional CCD 8 through an optical unit including the lens 7.

Figure 3:
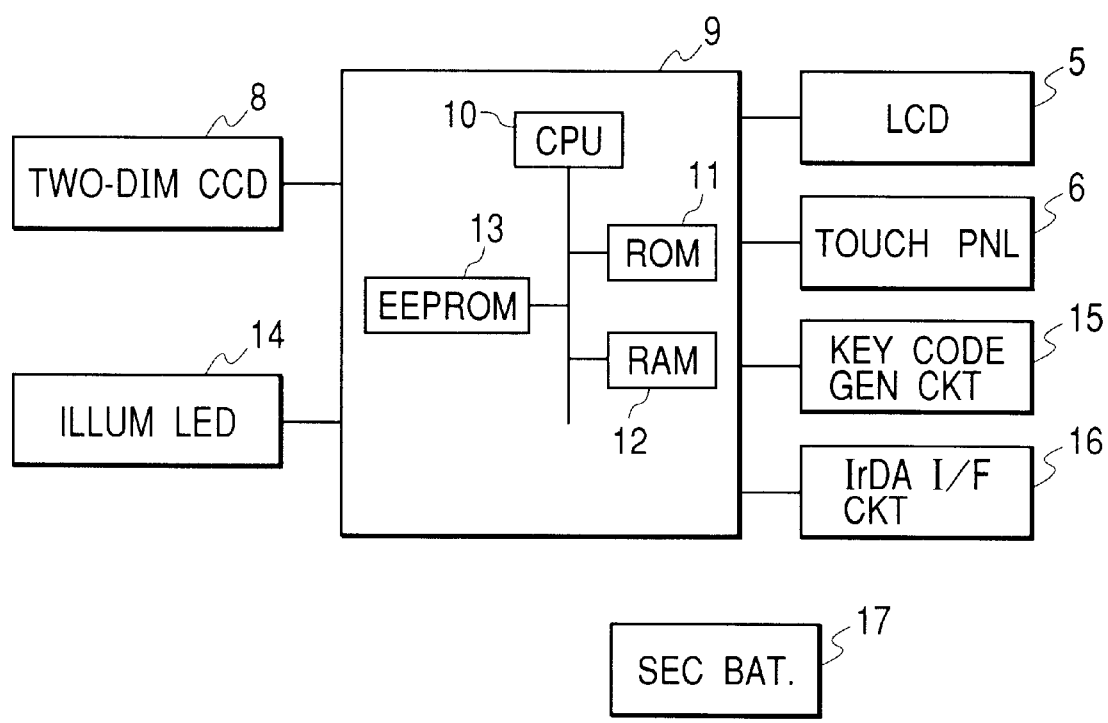
FIG. 3 is a block digram of the portable reader according to the present invention.

FIG. 3 shows a data processing system of the portable reader according to the present invention. The data processing system includes the two-dimensional CCD 8, the illumination LED 14, a microprocessor 9, the liquid crystal display 5, the touch panel 6 for generating touched position data in response to touch to the surface of the touch panel 6, a key code generation circuit 15 for generating a key code in response to the keyboard 3, an IrDA interface circuit 16 for communicating with an external unit in accordance with a protocol defined by the IrDA (Infrared Data Association) standard, and a secondary battery 17 such as Ni—Cd battery for supplying an electronic power to the data processing system.

The microprocessor 9 includes a CPU (central processing unit) 10, a ROM (read-only memory) 11 for storing control programs, a RAM (random-access memory) 12, and an EEPROM (electrical erasable programmable read-only memory) 13.

The portable reader further includes a trigger key 4*a* on the side surface of the portable case 2 as a portion of the keyboard 3. The trigger key 4*a* starts the reading operation.

To read a QR code (two-dimensional data code matrix), an operator presses the opening portion 21 against a label with the QR code and operates the trigger key 4*a*. In response to this the illumination LED 14 turns on to illuminate the label. The reflected light is focused on the two-dimensional CCD 8 with the optical unit including the lens 7. The image on the two-dimensional CCD 8 generates an image signal indicative of the two-dimensional pattern on two-dimensional CCD 8, that is, the QR code. The image signal is stored in the EEPROM 13 to store the two-dimensional pattern. The CPU 10 reads the image signal to decode the image signal as the QR code and displays the two-dimensional pattern of the QR code. The decoded QR code is supplied to an external unit through the IrDA interface circuit 16 if the QR code is correctly decoded. Moreover, the image signal is stored in the EEPROM 13.

The keys 4 of the keyboard 3 are used for inputting a number and a letter or the like. In addition, a predetermined key operation, that is, operation of a plurality of keys 4 in a predetermined order can input a kana (used in a Japanese system of syllabic writing). The CPU 10 displays the inputted number, letter, or kana on the liquid crystal display 5. A kana may be inputted by converting a Roman character that is inputted by one to three letters because a kana can be expressed using one to three letters. After the input of kanas, another predetermined key operation converts the kanas in the RAM 12 into a Chinese character or a phrase including a Chinese character and kanas. The CPU 10 displays the Chinese character in place of the kanas before conversion. That is, the CPU 10 can repeatedly convert one type of character into another type of character.

If the keyboard 3 is of a non-alphabet key type, letters are also inputted by the predetermined key operation. Moreover, a kana or the Chinese character is provided from the inputted letters as mentioned above.

Moreover, in response to another predetermined operation to the keyboard 3 after input of a number, a letter, a kana, or a Chinese character, the CPU 10 stores the input character as character data. Alternately, the CPU transmits the input character to the external unit through the IrDA interface circuit 16 as character data together with the image data regarding the data with the relationship therebetween, effectively entering a message corresponding to a QR code.

Alternatively, the CPU 10 encodes the input character to QR code data. The QR code data is serially transmitted to an external unit through the IrDA interface circuit 16. The external unit generates the QR code (QR code bit map image, for example, printed image) in accordance with the transmitted QR code data.

The position of the inputted number, letter, kana, or Chinese character can be changed upwardly, downwardly, right and left by operation of scroll keys of the keys 4.

The touch panel 6 on the liquid crystal display 5 detects the pressure thereon and a position of a pressed portion thereof. An operator draws a character on the touch panel 6 with a pen 18. The CPU 10 recognizes the handwritten character or the like. When a character is handwritten, the CPU 10 recognizes the presser position detected by the touch panel 7 and displays the handwritten character or the like on the liquid crystal display 5.

The detected handwritten character is stored in the EEPROM 13 or transmitted to the external unit in the form of bit map data, run-length data, or the like together with the image data of the QR code from the EEPROM 13.

Alternatively, the CPU 10 recognizes the detected handwritten characters and the recognized data is converted into character code data which is stored in the EEPROM 13 or transmitted to the external unit together with the image data of the QR code.

Figure 4:
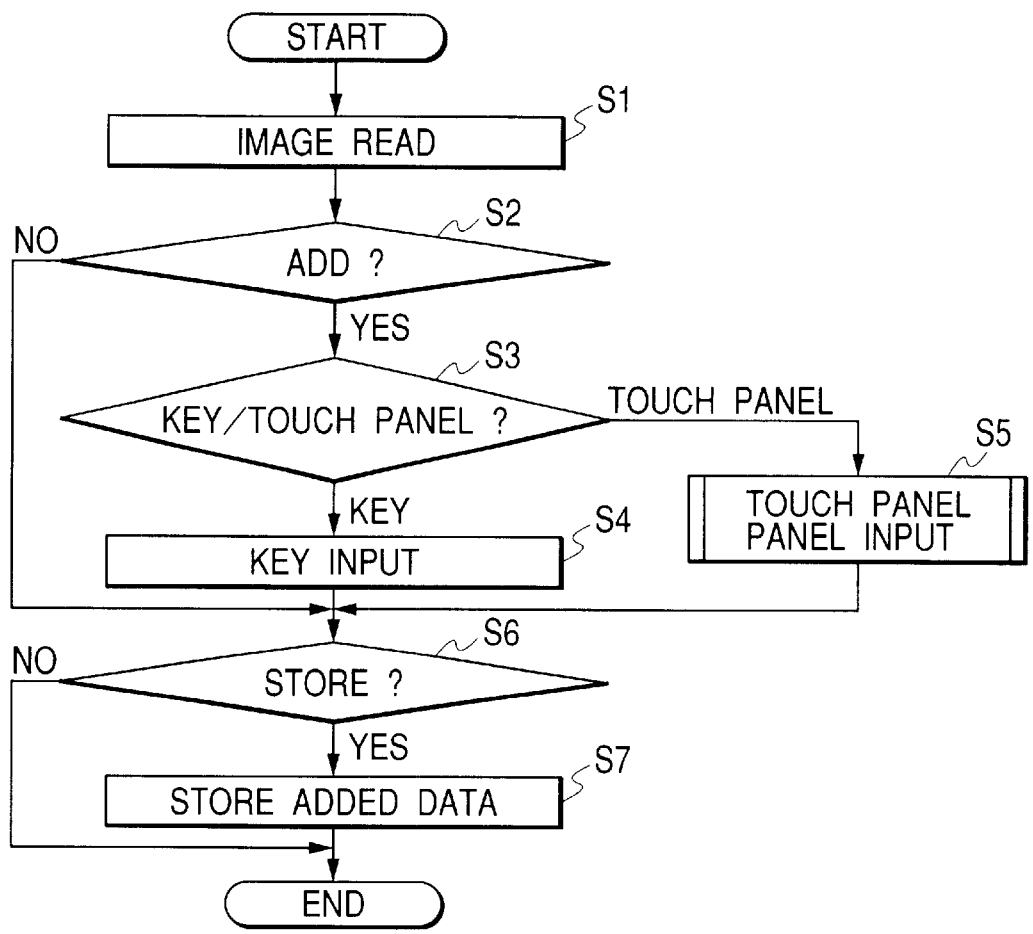
FIG. 4 depicts a flow chart illustrating data addition operation according to the present invention.

Referring now to FIG. 4, storing operation of the image data of the QR code is shown together with a message in the EEPROM 13.

When the operator operates the trigger key 4*a* to read a QR code on a label, in step S1 the CPU 10 turns on the illumination LED14 and reads the QR code with the two-dimensional CCD 8 and displays the read QR code on the liquid crystal display 5 as shown in FIG. 1.

To add a message, a memorandum, or a comment relating the read image of the QR code to the read image data (a related message) and to store the related message in the EEPROM 13, the operator depresses a predetermined key for data addition on the keyboard 3. In response to this, i.e., YES in step S2, the CPU 10 enters the data addition mode. In the following step S3, the CPU 10 requests a key input operation to judge whether the message is inputted with the touch panel 6 or the key 4.

If the operator selects the key input operation (Key in step S3), the CPU 10 enters the key input mode. In step S4, the CPU 10, receives key inputting and converts the key code into character data of letters, into character data of kana if required, and into character data of Chinese characters if required, and displays the additional data with the character data to re resent a date, a message or the like on liquid crystal display 5.

If the operator selects the handwriting input operation (touch panel in step S3), the CPU 10 enters the touch input mode. In step S5, the CPU 10 receives handwriting input and displays the handwritten data as additional data on the liquid crystal display 5.

In step S6, the CPU 10 requires selection regarding storing to judge whether the added data is stored. If YES, the CPU 10 stores the image data of the QR code and the inputted related message data as added data in step S7 and processing ends.

In step S6, if the storing operation is not required, processing ends to cancel the inputted message or the like to reenter it with correction or the like.

Figure 5:
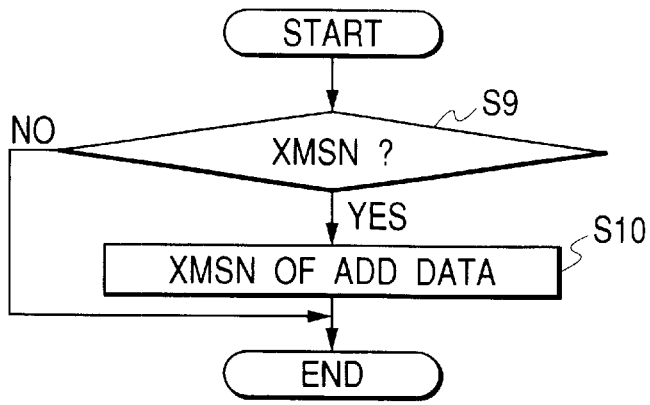
FIG. 5 depicts a flow chart illustrating data transmission operation according to the present invention.

Referring now to FIG. 5, a transmission operation is shown. This operation is periodically executed in response to timer interruption. The CPU 10 judges whether there is a request for transmission of the QR code and the related message is stored in the EEPROM 13. In response the keyboard 3, the CPU 10 transmits (YES in step S9), reads the image data of the QR code from the EEPROM 13, and transmits the image data of the QR code and the added related message data to the external unit in step S10, and processing ends. If the message data is not stored (the root from step S2 to step S6), only the image data is transmitted.

If the QR code is correctly recognized and decoded, the decoded code and the additional message may be stored in the EEPROM 13 and transmitted to the external unit when the message data is inputted or may be stored and transmitted without additional data when there is no input of message data.

As mentioned above, according to the embodiment, the reader can store the read image and the related message in the EEPROM 13. If the stored image data is read and displayed by an operator, the operator is also able to display the related message. Therefore, the operator can know, for example, when and where the QR code is read, which article carried the QR code, or or whether the OR code is displayed properly from the added message displayed with the image data of the QR code. Using this functionality, the operator will not confuse the image data of the QR code with similar images of other QR codes.

Moreover, this portable reader is provided with key inputting and touch panel inputting of the message, so that the operator can select either of the key input or the handwriting input in accordance inclination of the operator.

This invention provides various modifications.

For example, the message may be added only by the key input or only by the touch panel 6.

The read image may be one-dimensional code such as a bar code, or other two-dimensional codes other than the QR code, or a picture image. If the one-dimensional code is read, the optical reading means may be a line sensor. The read image may be stored in the RAM 12. The reader may be not a portable type, that is, may be a situational type.

Figure 6:
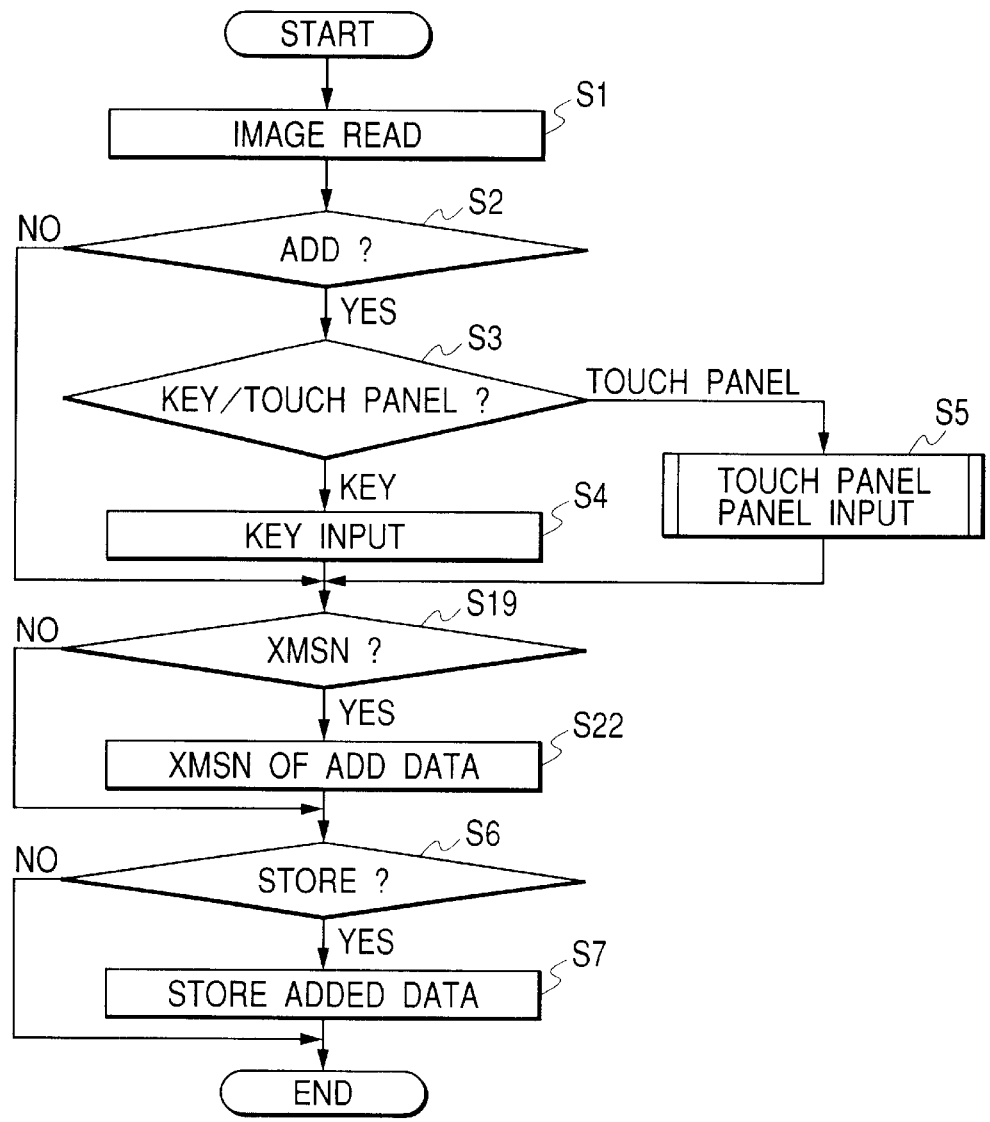
FIG. 6 depicts a flow chart illustrating modified data addition operation according to the present invention.

FIG. 6 shows a modification of the data addition operation. The data addition operation according to the flow chart in FIG. 6 is substantially the same as that shown in FIG. 4. The difference is that transmission operation is further provided between the step S4 (step S5) and step S6. That is, after key input operation in step S4 and touch panel operation in step S5, the CPU 10 inquires of the operator whether transmission operation is needed. If the transmission operation is not needed, processing directly proceeds to step S6. If the transmission operation is needed, the CPU 10 transmits the image data and the additional related data (message data) as added data to the external unit. In this case, the transmission portion of the IrDA interface circuit 16 should be directed to the external unit to transmit an infrared beam to the external unit. However, if the transmission circuit uses a radio wave signal, the data can be transmitted at any time if the reader is within the service range of the external unit.

Figure 7:
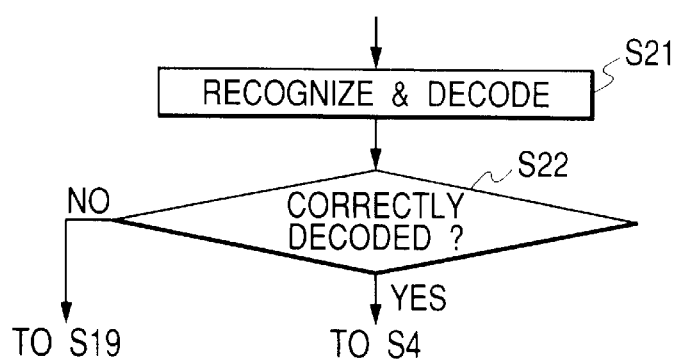
FIG. 7 is a modification of the example shown in FIG. 6 according to the present invention.

FIG. 7 is a modification of the example shown in FIG. 6. That is, in place of the process in step S2 in FIG. 6, steps S21 and S22 are executed. After reading the data code image, the CPU 10 recognizes and decodes the image data in step S21. Next, the CPU 10 judges whether the image data is correctly decoded in step S22. The data input operation in step S3 or step S5 is executed when the image data is incorrectly decoded. In the data storing operation in step S7, decoded data is stored in the EEPROM 13 in place of the image data, and the data addition operation is omitted when the image data is correctly decoded.

What is claimed is:

1. A data code image reading apparatus comprising:
    optical reading means for reading a data code image as image data;
    display means for displaying said image data;
    data input means for manually inputting related data related to said image data in response to a direct operation by a user; and
    storing means for storing said image data and said related data inputted in response to said direct operation by said user.

2. A data code image reading apparatus as claimed in claim 1, further comprising outputting means for outputting said image data and said related data.

3. A data code image reading apparatus as claimed in claim 1, wherein said data input means comprises a transparent touch panel on a displaying surface of said display means.

4. A data code image reading apparatus as claimed in claim 1, wherein said data input means comprises a keyboard having a plurality of keys and having a character mode and a non-character mode, wherein, in said character mode, said data input means inputs a character by a predetermined key operation.

5. A data code image reading apparatus as claimed in claim 4, wherein said data input means further includes a memory and a character conversion mode for converting a set of characters previously inputted by said data input means into another type of character.

6. A data code image reading apparatus comprising:
    optical reading means for reading a data code image as image data;
    display means for displaying said image data;
    data input means for manually inputting related data related to said image data in response to a direct operation by a user; and
    outputting means for outputting said image data and said related data inputted in response to said direct operation by said user.

7. A data code image reading apparatus as claimed in claim 6, further comprising storing means for storing said image data and said related data to supply said image data and said related data to said outputting means.

8. A data code image reading apparatus as claimed in claim 1, further comprising:
    recognizing and decoding means for recognizing and decoding said image data; and
    judging means for judging whether said data input means operates to input said related data related to said image data when said image data is incorrectly decoded, and said storing means stores the decoded data in place of said image data when said image data is correctly decoded.

9. A data code image reading apparatus comprising:
    a light-emitting device for emitting light to illuminate a data code image;
    a charged coupled device (CCD) for creating an image data signal based on data code image;
    an optical unit for focusing reflected light emitted from the light-emitting device onto the CCD;
    a processor in communication with the CCD for decoding the image signal into a quick response code;
    a display for displaying the quick response code; and
    a data input device for receiving related data related to the quick response code from a user.

10. The data code image reading apparatus of claim 9, wherein the processor is further for storing the image signal and the related data related to the quick response code.

11. The data code image reading apparatus of claim 9, further comprising a transmitter for outputting the quick response code and the related data related to the quick response code.

12. The data code image reading apparatus of claim 9, wherein the data input device comprises a transparent touch panel on a displaying surface of said display means.

13. The data code image reading apparatus of claim 9, wherein the data input device comprises a keyboard having a plurality of keys and having a character mode and a non-character mode, wherein, in said character mode, the data input device inputs a character by a predetermined key operation.

14. The data code image reading apparatus of claim 13, wherein the data input device further comprises a memory and a character conversion mode for converting a set of characters previously inputted by the data input device into another type of character.

* * * * *